W. BECKMANN.
CHANGE SPEED GEARING.
APPLICATION FILED DEC. 4, 1914.
1,178,289. Patented Apr. 4, 1916.
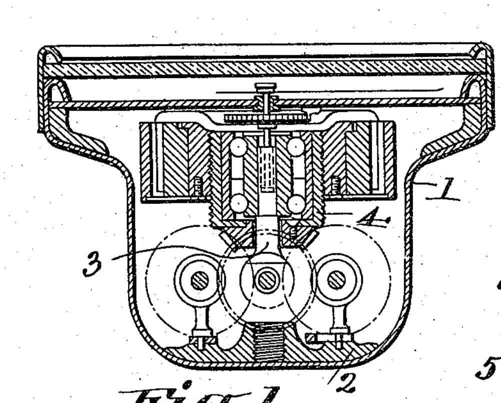
Fig. 1.
Fig. 3.
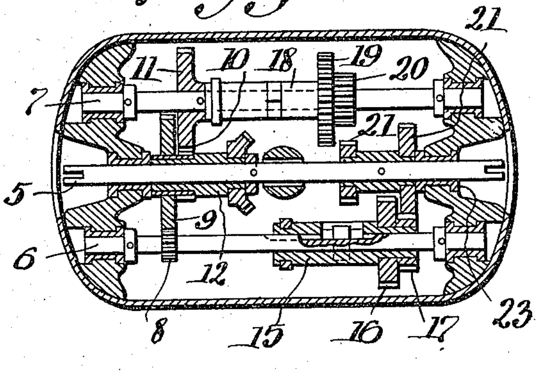
Fig. 2.
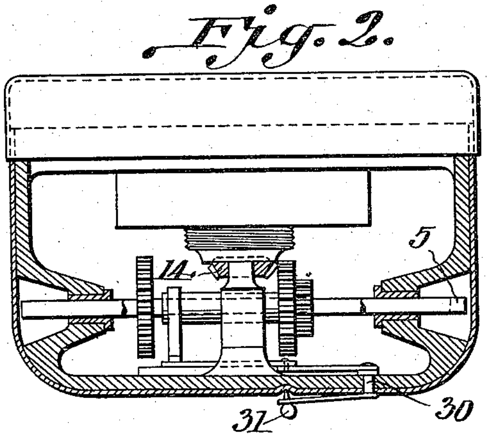
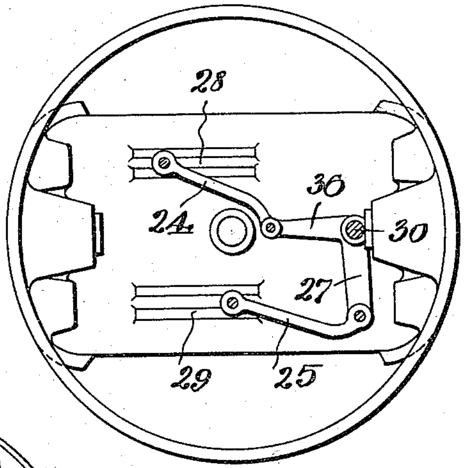
Fig. 4.
Fig. 5.
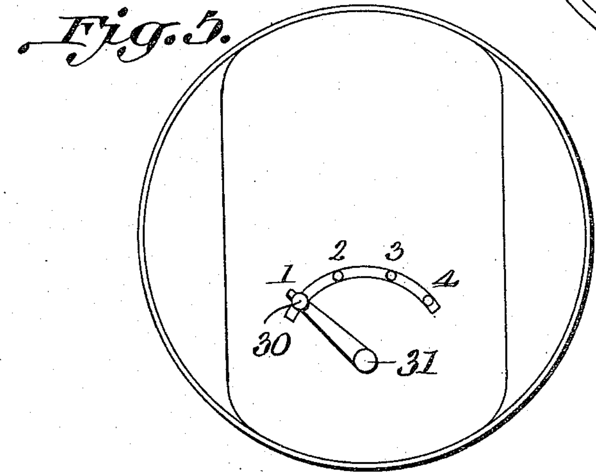
Inventor:
Wilhelm Beckmann
By Emil Neuwelycke
Atty.
THE COLUMBIA PLANOGRAPH CO., WASHINGTON, D. C.

UNITED STATES PATENT OFFICE.

WILHELM BECKMANN, OF BERLIN, GERMANY.

CHANGE-SPEED GEARING.

1,178,289. Specification of Letters Patent. Patented Apr. 4, 1916.

Application filed December 4, 1914. Serial No. 875,428.

*To all whom it may concern:*

Be it known that I, Wilhelm Beckmann, subject of the King of Prussia, residing at 5 Fontanepromenade, Berlin, Germany, have invented certain new and useful Improvements in Change-Speed Gearing, of which the following is a specification.

The present invention relates to change speed gears, and particularly such gears as are used in so-called hand-tachometers, which indicate a plurality of speed-ranges.

The principal object of the present invention is to provide a speed changing gear which is particularly compact in construction and in which the parts are readily accessible for inspection and repairs.

To this end, the invention essentially consists in combining with a drive shaft a pair of suitable auxiliary shafts parallel to the driving shaft and carrying the speed gears in the particular relation hereinafter defined.

It is already known, in hand-tachometer constructions, to provide a plurality of speeds, as for example, four speeds, by displacing a set of gears relatively to one another on a single shaft parallel to a driven shaft, this construction, however, possessing the disadvantage of a very great length, and requiring a great deal of surplus motion in shifting the gears. It is also known to provide four independent gear shafts, one for each speed, and also to divide the gears into two groups of two speeds each. The former, however, possesses the disadvantage of requiring four separate devices for engaging the separate speeds, and the latter requires at least two gear shifting devices.

The present invention has, then, for its object to provide an improved construction in which two auxiliary shafts are provided at opposite sides of the main shaft, and the four speed devices being arranged in two identical groups of two speeds each, one of said groups being disposed on each of said auxiliary shafts.

In the accompanying drawings the several figures disclose the improvement of the change speed gear adapted for use in a hand-tachometer.

Figure 1 is a vertical cross section through such a hand-tachometer in elevation. Fig. 2 is a vertical longitudinal section in elevation. Fig. 3 is a horizontal section in plan. Fig. 4 is a plan of the casing with the rotary switch, the gearing having been removed. Fig. 5 is a bottom view of the casing with the adjusting lever for the rotary switch.

In these figures 1 is the envelop pressed of sheet metal which fits closely to the cage-like casing 2 and envelops the whole instrument. In the center of the casing a vertical stationary shaft 3 is disposed, to which the magnet system 4 is journaled by means of ball bearings.

5 is a shaft extending right across the instrument and serving as driving shaft. The two ends of this shaft project beyond the casing and are so arranged, that either end may serve for driving. Symmetrically to this driving shaft 5 are the two parallel auxiliary shafts 6 and 7 journaled in the casing 2. They are permanently coupled with each other by means of a set of gears consisting of spur gears 8, 9, 10, 11, the ratio of which is preferably chosen in tachometers at 1:10. In the embodiment shown in the drawings the spur gear 8 is rigidly fitted to the parallel shaft 6, said spur gear 8 permanently meshing with spur gear 9. Spur gear 9 is fitted on a sleeve 12, which runs loose on the driving shaft 5. Next to spur gear 9 is fitted a second spur gear 10 which is likewise rigidly fitted to the said sleeve 12 and permanently meshes with a spur gear 11 fitted to the second parallel shaft 7. To the sleeve 12 is further fitted a bevel gear 13, which meshes with a corresponding bevel gear 14. This latter bevel gear 14 is fitted to a system of magnets and revolves on the stationary shaft 3. On the parallel shaft 6 is fitted, loosely slidable, a sleeve 15, on which two spur gears, 16, 17 are rigidly fitted. In a similar manner a sleeve 18 with two spur gears 19, 20 is fitted axially slidable on shaft 7. The shafts 6 and 7 are revolved by the spur gears by means of suitably provided slots and keys. The spur gears 16, 17 and 19, 20 may be engaged, at will, with two corresponding spur gears 21, 22 which are fitted to a sleeve 23 rigidly secured to shaft 5. To the sleeves 15, 18 of the speed gears 15, 16, 19, 20 are coupled two connecting rods 24 and 25 respectively, which are hinged to levers 26 and 27 respectively of the rotary switch. The ends of said connecting rods 24, 25 coupled to the sleeves are guided in suitable guides 28, 29 on the casing. The bell-cranks 26, 27 are rotatably fitted to a shaft 30 secured in the casing. The end of said shaft 30 extending beyond the casing carries an operating lever 31, end of which is provided with a handle and slides over a scale, and may be engaged with a projecting nose in suitably spaced notches. By means of this lever 31 the rotary switch may be adjusted into one of the four positions. Each of these positions corresponds with one of the four speeds, or with a certain engagement of the spur gears 16, 17, 19, 20 with the spur gears 21, 22.

At the engagement shown in Fig. 7 the tachometer would be driven in the following manner: By means of the driving shaft 5 the sleeve 23 with the gears 21, 22 is rotated, the gear 22 meshing with the gear 17 on parallel shaft 6, so that the latter is rotated. This parallel shaft 6 drives by means of the gear 8 rigidly fitted thereto the gear 9 on sleeve 12, whereby the sleeve and with it the bevel gear 13 is rotated, and the bevel gear 14 driven thereby, rotates the system of magnets. The shaft 7 in this case runs idle.

It may be here mentioned, that the hereinbefore described speed gear is not only adapted for use in tachometers, but may also be employed with advantage for motorcars, machine tools and the like.

I claim:

1. In a speed measuring device having a plurality of measuring ranges, a driving shaft, a driven element, a pair of auxiliary shafts parallel to said driving shaft, identical sets of speed changing gears carried by said auxiliary shafts, corresponding gears on said driving shaft adapted to be connected with the gears on said auxiliary shafts to secure several speed changes, a set of gears on said driven element, and fixed gears also on said auxiliary shafts and meshing with said gears on the driven element.

2. In a speed measuring device having a plurality of measuring ranges, the combination of a driving shaft, a driven element, a pair of auxiliary shafts parallel to said driving shaft, sets of speed changing gears carried by said auxiliary shafts adapted to be connected to said driving shaft to secure the several speed changes, gear connections between said driven element and said auxiliary shafts, and a common shifting device for said sets having a constant positive connection therewith.

3. In a speed measuring device, having a plurality of speed ranges, the combination of a driving shaft, a driven element, a pair of auxiliary shafts parallel to said driving shaft, sets of speed changing gears carried by said auxiliary shafts and adapted to be connected to said driving shaft to secure the several speed changes, gear connections between said driven element and said auxiliary shafts, and a common rotary shift device connected to said sets of gears for effecting their connection with the driving shaft.

4. In a speed measuring device having a plurality of measuring ranges, the combination of a driving shaft, a driven element, a pair of auxiliary shafts parallel to said driving shafts, sets of speed changing gears carried by said auxiliary shafts and adapted to be connected to said driving shaft to secure the several speed changes, gear connections between said driven element and said auxiliary shafts, a bell crank lever, and links operatively connecting the arms of said bell crank lever to said sets of gears so that during the shift of one set of gears into engaging position with said driving shaft the opposite set of gears is substantially at rest.

In testimony whereof I have affixed my signature in presence of two witnesses.

WILHELM BECKMANN.

Witnesses:
WOLDEMAR HAUPT,
HENRY HASPER.

Copies of this patent may be obtained for five cents each, by addressing the "Commissioner of Patents, Washington, D. C."